Patented Apr. 30, 1940

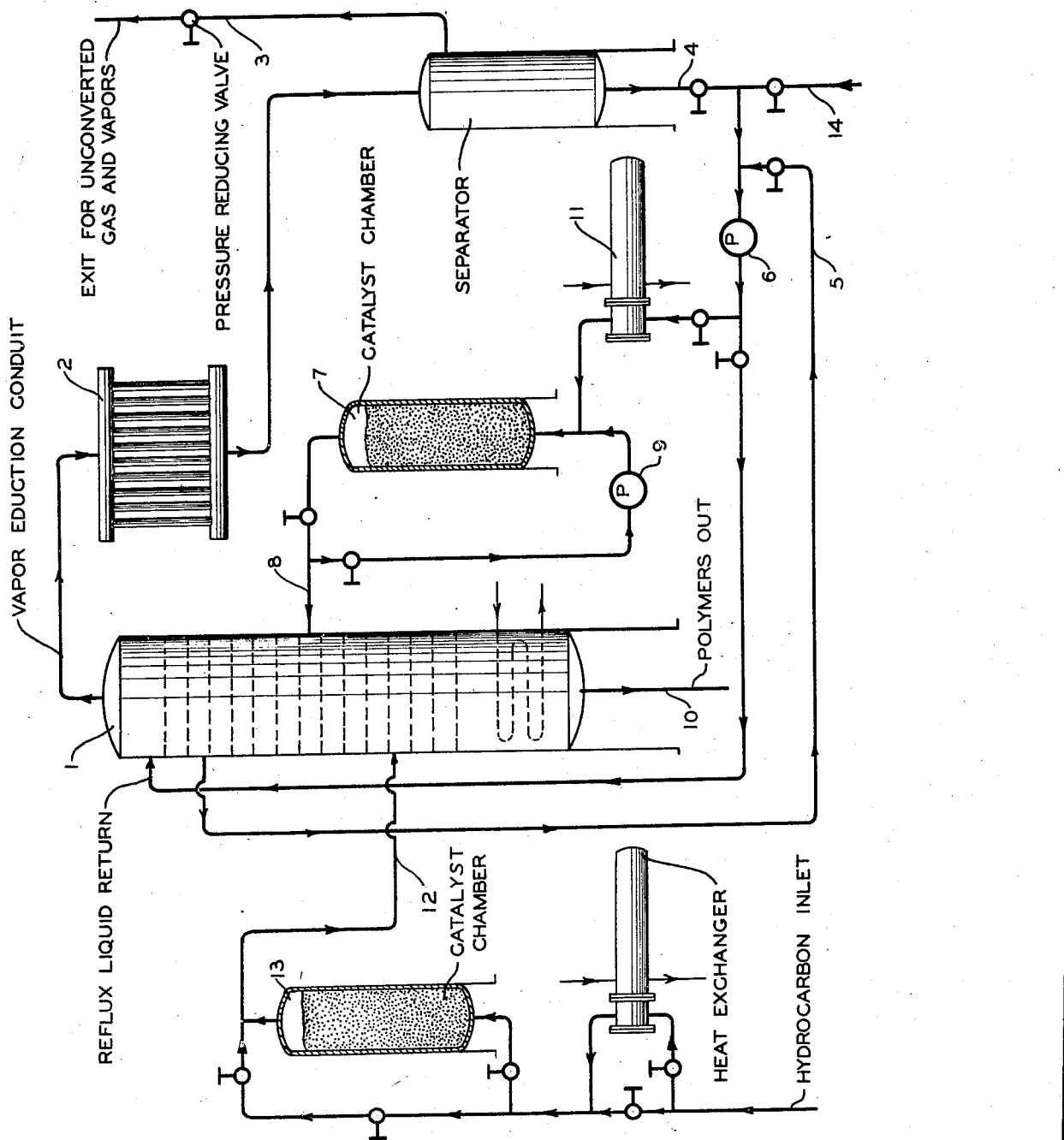

2,198,937

UNITED STATES PATENT OFFICE 2,198,937

PROCESS FOR CONVERTING HYDROCARBONS

Frederick E. Frey, Paul V. McKinney, and William H. Wood, Bartlesville, Okla., assignors to Phillips Petroleum Company, a corporation of Delaware Application October 11, 1934, Serial No. 747,964

9 Claims. (Cl. 196—10)

This invention relates to processes for converting olefins of low molecular weight into normally liquid hydrocarbons of higher molecular weight by means of catalytic polymerizing agents. More specifically this invention is concerned with effecting the production by catalytic means of volatile normally liquid polymers of low molecular weight suitable for motor fuel, while minimizing the formation of non-volatile heavier products.

It has long been known that solid aluminum chloride, zinc chloride, hydrous aluminum silicates and many other materials will effect the polymerization of liquid isobutylene, propylene and the butenes to products of high boiling point, and polymers having the properties of lubricating oils have been prepared in this way.

Certain active polymerization catalysts, notably fuller's earth and hydrous silica associated with alumina, have been shown to effect the conversion of simple olefins almost exclusively into volatile normally liquid hydrocarbons of low molecular weight provided the reaction be conducted at somewhat elevated temperatures while maintaining the olefin at a low pressure and in the gaseous form. At elevated pressures we have found that the rate of conversion effected by the catalyst may be greatly increased, but when the reaction is conducted in the usual way, that is by passing the compressed hydrocarbons in the gaseous state through a bed of catalytic material, the polymerization products contain a large proportion of hydrocarbons of high boiling point unsuitable for gasoline, and polymers of this character are obtained even when the reaction is interrupted before an extensive conversion of the simple olefins has taken place. This result is probably to be attributed to the formation of polymers which exist in the liquid state at the moderate temperatures, below 250° C., required for polymerization when such highly active catalysts are used. The liquid film on the catalyst surface apparently causes prolonged contact of polymers with the active areas with resultant polymerization to products of excessively high molecular weight. Liquid and gaseous products, both in substantial amount, are discharged from the catalyst during the reaction in such a case.

We have discovered that the production of mainly volatile polymers can be effected and the formation of higher polymers greatly reduced by maintaining in the liquid condition the hydrocarbon material undergoing treatment while passing it over the polymerization catalyst. A high rate of conversion can be obtained at temperatures markedly lower than those required for gas phase-low pressure polymerization and the life of the catalyst is prolonged. The presence of inert diluents such as paraffin hydrocarbons admixed with the olefins will assist in maintaining optimum operating conditions. A rapid rate of linear flow also decreases the proportion of heavier hydrocarbons in the polymers and the extent of conversion may be maintained at a high value by continuously returning a part of the liquid leaving the catalyst to the catalytic treatment. An extent of conversion of the simple olefins of less than 80 per cent in a single catalytic treatment must usually be maintained to avoid the excessive formation of polymers of high boiling point.

In applying the liquid phase conversion described we have found that isobutylene, diluted somewhat with paraffins, conveniently butanes, can be polymerized by means of hydrous silica associated with alumina at 50–100° C., butene-2 at 100–150° C. and butene-1 and propylene at 150–200° C. while ethylene is not extensively converted unless a particularly active catalyst is used. Both high olefin concentration and high catalyst activity lower the temperature required and temperatures somewhat higher or lower than the ranges exemplified will in some cases give best results. A superatmospheric pressure is ordinarily required for maintaining the liquid state when converting the normally gaseous olefins; 100 to 500 or more pounds per square inch pressure is required when the content of normally liquid hydrocarbons in the mixture to be converted is small.

The object of this invention is to augment the yield of gasoline hydrocarbons obtainable in cracking processes by applying the catalytic conversion to simple olefins formed as by-products, these simple olefins being converted into polymeric products of low molecular weight. Through the use of our invention, it is possible:

1. To effect rapid conversion at the catalyst surface and prolong the catalyst life.

2. To utilize the temperatures and pressures developed in the fractional distillation of gaseous hydrocarbons to effect catalytic polymerization in the liquid phase.

3. To provide in the joint operation of a fractionating column or separator and catalyst chamber in an entirely novel manner, an economical means for subjecting simple olefins to more than one catalytic treatment with separation of the polymeric products after each treatment.

4. To provide two or more catalytic treatments to effect polymerization in separate steps, first of highly reactive branched olefins, and, subsequently and at a higher temperature, of the surviving less reactive normal olefins.

In the attached drawing is shown an apparatus for carrying out the invention.

Hydrocarbons containing simple olefins, predominantly ethylene, propylene, butylenes, and amylenes are introduced into fractionating column or separator 1 under a pressure sufficiently high to maintain a considerable proportion of the olefins in solution in the liquid descending within the column. Vapors withdrawn from the top of the column pass through a condenser 2 in which the condensible hydrocarbons are liquefied under pressure while the uncondensed portion is discharged from pipe 3. The condensed hydrocarbons withdrawn thru pipe 4 may be mingled with any desired proportion of hot liquid withdrawn thru pipe 5 from a fractionator plate in the upper part of the column and the mixture delivered by pump 6, in part to the top of column 1 to serve as reflux liquid and in part to catalyst chamber 7, containing the polymerization catalyst, through which it passes while the liquid state is maintained and thence, polymerization having been effected, to column 1 where it enters at a point 8 below the point of eduction 5. The formation of the higher polymers at the expense of the lower polymers is reduced by maintaining a high linear velocity of flow through the catalyst chamber. This may be accomplished by continuously returning a part of the effluent from catalyst chamber 7 to the inlet of the chamber by means of pump 9. Polymeric products resulting from the catalytic reaction, and brought into column 1 at point 8, are separated from lower boiling materials in the column and discharged at 10.

For treating in the process, propylene and butylenes accompanied by propane and butanes are especially suitable and by maintaining a pressure in the fractionator of 100 to 400 pounds or more, liquid may be drawn from the column at 5 with a temperature sufficiently high to bring about reaction in the catalyst chamber. The higher pressures are required when the hydrocarbon mixture introduced to the column contains a high proportion of hydrocarbons of low molecular weight. In such cases the temperature of the liquid withdrawn at 5 may be too low for effective catalytic conversion. In this event additional heat may be imparted by heater 11 before the hydrocarbons are introduced into the catalyst chamber 7.

A mixture of normally gaseous hydrocarbons containing large proportions of propylene and butylene can be readily converted, and low proportions of olefins, 5–10 per cent or even less, can also be converted successfully, a somewhat higher reaction temperature being required. Gases suitable for conversion may be obtained from many sources. The catalytic dehydrogenation of paraffin hydrocarbons such as propane and butane to hydrogen and the corresponding olefins, yields suitable olefin-containing gases which may be compressed and introduced to column 1 at 12. Gases obtained by cracking lower paraffins to produce olefins are also suitable. Since the column 1 provides a means of separating higher hydrocarbons from the lower olefins and paraffins prior to catalytic treatment of the latter, hydrocarbon mixtures containing, in addition to the simple olefins and paraffins, normally liquid hydrocarbons can be treated in the process. Such mixtures are obtained by cracking petroleum at either a high or a low pressure, or by cracking normally gaseous hydrocarbons either under high pressures, whereby gasoline and simple olefins and paraffins are produced, or under a low pressure, in which case also olefins are obtained but the normally liquid hydrocarbons formed are aromatic in character. When treating such mixtures the liquid discharged at 10 is a mixture of the higher hydrocarbons in the charging stock with the polymers produced by the catalytic treatment. We have found that isobutylene and the branched amylenes, when present in large proportion together with the simple normal olefins, encourage the formation of higher polymers, when an attempt is made to convert the greater part of the olefins present. In such case a second polymerizing chamber 13 may be used to advantage. The material to be treated is passed first through catalyst chamber 13 at a temperature sufficiently high to effect polymerization of a large proportion of the branched olefins then, after a removal of the polymers formed has been effected in column 1, a second catalytic treatment, in chamber 7, at a substantially higher temperature than that used in chamber 13 is applied to effect polymerization of the simple olefins, mostly of normal structure surviving the first catalytic treatment. The temperature required for the second conversion step must usually be higher by at least 50° C. than that required for the first step.

Hydrocarbon mixtures predominating in hydrocarbons of 3 to 5 carbon atoms per molecule contain propylene, butylenes and the amylenes, which are the olefins most suitable for conversion by our process. Pressures of 600–1000 pounds per square inch or more are required for maintaining the liquid state at reaction temperatures of 150 to 200° C. and in some cases where a reaction temperature of 200° C. more or less is needed, inert hydrocarbons such as uncracked naphtha or gasoline may be added to the hydrocarbons to be treated by means of pipe 14 in order to raise the critical temperature of the reacting mixture and maintain substantially the liquid condition in the presence of the catalyst. The presence of a small proportion of the hydrocarbon in the gaseous condition while passing through the catalyst is not seriously detrimental provided the greater part of the hydrocarbon treated is maintained in the liquid condition throughout its flow through the catalyst.

As an example of the operation of the process a hydrocarbon mixture predominating in normally gaseous olefins and paraffins is passed into a fractionating column and a liquid condensate predominating in butane and containing 16 per cent of olefins chiefly butylenes and propylene is drawn from the column and passed at a temperature of 110° C. while maintained in the liquid condition by a pressure of 400 pounds per square inch, through a bed of granular catalyst consisting of hydrous silica impregnated with a small amount of aluminum chloride. The liquid discharged from the catalyst and containing polymers is returned to the column and the polymers separated from the gaseous hydrocarbons is removed from a low point in the column. The catalyst effects a conversion of 85 per cent of the olefins entering to polymers, of which 80 per cent distill below 170° C. The same gas condensate, containing 16 per cent of olefins, passed at 110° C. over another portion of the same catalyst, under 100 pounds per square inch pressure, but in the gaseous state, yields polymer amounting to 75 per cent of the olefin treated of which only 30 per cent distills below 170° C.

What we claim and desire to secure by Letters Patent is:

1. A catalytic process for converting olefin hydrocarbons of not more than five carbon atoms per molecule into low boiling hydrocarbons of higher molecular weight which comprises passing an essentially non-aromatic hydrocarbon mixture containing olefins of not more than five carbon atoms per molecule over a stationary solid polymerization catalyst comprising hydrous silica associated with alumina maintained in a catalyst chamber at a temperature sufficient to induce formation of higher molecular weight hydrocarbons from said olefins but less than 200° C. and under a superatmospheric pressure sufficient to maintain said mixture in liquid phase, simultaneously recirculating a portion of the effluents from said catalyst chamber over said solid polymerization catalyst in admixture with said hydrocarbon mixture to increase the rate of linear flow and thereby minimize the formation of high boiling polymers, and passing another portion of said effluents to separating means and separating therefrom higher molecular weight hydrocarbons formed.

2. A catalytic process for converting olefin hydrocarbons of not more than five carbon atoms per molecule into volatile hydrocarbons of higher molecular weight, which comprises passing an essentially non-aromatic hydrocarbon mixture containing olefins of five carbon atoms or less per molecule through a contact zone containing a stationary solid polymerization catalyst at a superatmospheric pressure sufficient to maintain said mixture in liquid state and at a temperature sufficient to induce the formation of said hydrocarbons of higher molecular weight but not higher than the critical temperature of the mixture, continuously recirculating a sufficient portion of the effluent of said zone in admixture with said hydrocarbon mixture to increase the linear velocity of flow through said zone over that of the said hydrocarbon mixture entering the zone and thereby minimize the formation of high boiling polymers, and passing another portion of said effluent to a separating zone and separating therefrom higher molecular weight hydrocarbons formed.

3. A process for converting olefin hydrocarbons of not more than five carbon atoms per molecule into low boiling hydrocarbons of higher molecular weight by means of a body of hydrous silica associated with alumina catalyst which comprises passing an olefin-containing hydrocarbon mixture into a heated fractionating means, withdrawing from said means a hydrocarbon mixture in a liquid state containing olefins of five carbon atoms or less per molecule, passing said liquid mixture into contact with a body of hydrous silica associated with alumina catalyst, maintaining a reaction temperature above 50° C. but no higher than the critical temperature of the hydrocarbon mixture present and maintaining a superatmospheric pressure sufficient to maintain the hydrocarbon mixture in a liquid state, passing at least a portion of the effluents from said body of catalyst into said fractionating means, removing from said means a fraction containing said higher molecular weight hydrocarbons, and operating said fractionating means under a superatmospheric pressure such that the said withdrawn hydrocarbon mixture in a liquid state containing olefins of five carbon atoms or less per molecule is at a temperature sufficiently high to maintain said reaction temperature.

4. The process of catalytically converting normally gaseous olefin hydrocarbons of more than two carbon atoms per molecule into polymers predominantly of the boiling range of gasoline which comprises passing a hydrocarbon mixture containing normally gaseous olefins of more than two carbon atoms per molecule over a hydrous silica associated with alumina catalyst maintained at a reaction temperature above 50° C. but no higher than the critical temperature of the hydrocarbon mixture in contact with the catalyst and maintaining a superatmospheric pressure upon said hydrocarbon mixture in contact with the catalyst sufficient to maintain said mixture in a liquid state.

5. The process according to claim 4 in which saturated hydrocarbons of higher boiling point than the hydrocarbon mixture charged are added thereto to aid in maintaining the liquid phase.

6. A process for converting olefin hydrocarbons of not more than five carbon atoms per molecule into low boiling hydrocarbons of higher molecular weight which comprises passing an olefin containing hydrocarbon mixture into a heated fractionating means, withdrawing from said means a hydrocarbon mixture in liquid state containing polymerizable olefins of five carbon atoms or less per molecule, passing said liquid mixture through a contact zone containing a stationary polymerization catalyst at a superatmospheric pressure sufficient to maintain the mixture in contact with the catalyst in the liquid state and at a temperature sufficient to induce the formation of said hydrocarbons of higher molecular weight, but not above the critical temperature of the mixture in contact with the catalyst, continuously recirculating a portion of the effluent of said zone in admixture with said hydrocarbon mixture to increase the linear velocity of flow through said zone over that of the said hydrocarbon mixture entering the zone and thereby minimizing the formation of high boiling polymers, passing another portion of said effluent to a separating zone and separating therefrom higher molecular weight hydrocarbons formed and operating said fractionating means under superatmospheric pressure such that the said withdrawn hydrocarbon mixture in a liquid state containing olefins of five carbon atoms or less per molecule is at a temperature sufficiently high to maintain the reaction temperature.

7. In a process of converting normally gaseous olefin hydrocarbons of more than two carbon atoms per molecule into polymers of higher molecular weight in which such olefins are passed over a solid polymerization catalyst at a conversion temperature higher than the critical temperature of said olefin hydrocarbons, the method of conducting such conversion while maintaining said olefins in liquid phase which comprises adding paraffin hydrocarbons having a higher critical temperature than the said conversion temperature to said olefins in such amounts that the critical temperature of the resultant mixture in contact with said catalyst is higher than the conversion temperature, and applying sufficient pressure to maintain the said resultant mixture in liquid phase.

8. A process for producing normally liquid hydrocarbons from normally gaseous hydrocarbon mixtures containing isobutene and other butenes which comprises contacting said mixture in a first polymerization step with a polymerization catalyst comprising hydrous silica associated with alumina at a temperature of about 50–100° C. to selectively polymerize at least a portion of the isobutylene content of said mixture, separating the polymer so formed from the remaining effluent of the first polymerization step, subjecting at least that portion of the remaining effluent containing the unconverted butenes to a second polymerization step by passing said portion over a polymerization catalyst comprising hydrous silica associated with alumina at a reaction temperature sufficient to convert a substantial portion of the butenes contained therein to liquid polymers but no higher than the critical temperature of the hydrocarbon mixture in contact with the catalyst and maintaining a superatmospheric pressure on said mixture sufficient to maintain said mixture in the liquid state.

9. A process for producing normally liquid hydrocarbons from mixtures of normally gaseous hydrocarbons containing isobutylene and olefins of straight chain structure, which comprises selectively polymerizing said isobutylene by contacting said mixture at a temperature within the range 50–100° C. with a polymerization catalyst comprising hydrous silica associated with alumina in a first polymerization zone, separating the polymers so formed from the remainder of said mixture, contacting a hydrocarbon mixture containing said straight chain olefins with a polymerization catalyst comprising hydrous silica associated with alumina in a second polymerization zone at a reaction temperature sufficient to convert a substantial portion of said straight chain olefins to liquid polymers but no higher than the critical temperature of the hydrocarbon mixture in contact with the catalyst, maintaining a superatmospheric pressure upon said hydrocarbon mixture in contact with the catalyst sufficient to maintain said mixture in a liquid state, and separating said polymers from the remaining effluent.

FREDERICK E. FREY.
PAUL V. McKINNEY.
WILLIAM H. WOOD.